(12) United States Patent
Yanai et al.

(10) Patent No.: US 8,488,590 B2
(45) Date of Patent: Jul. 16, 2013

(54) METHOD AND DEVICE USING DATA OBJECTS AND THEIR REPLICATIONS FOR CARRYING OUT COMMUNICATIONS IN A DISTRIBUTED SYSTEM

(75) Inventors: Shimon Yanai, Haifa (IL); Nir Dweck, Kadima (IL); Gil Zaidman, Kfar-Vitkin (IL)

(73) Assignee: Tadiran Telecom Ltd., Petach Tikva (IL)

( * ) Notice: Subject to any disclaimer, the term of this patent is extended or adjusted under 35 U.S.C. 154(b) by 1667 days.

(21) Appl. No.: 11/196,542

(22) Filed: Aug. 4, 2005

(65) Prior Publication Data

US 2006/0083221 A1 Apr. 20, 2006

(30) Foreign Application Priority Data

Oct. 14, 2004 (IL) .......................................... 164577

(51) Int. Cl.
*H04L 12/66* (2006.01)
*H04L 12/16* (2006.01)
*G06F 15/16* (2006.01)

(52) U.S. Cl.
USPC ........... 370/352; 370/260; 370/353; 370/354; 370/355; 370/356; 709/204; 709/205; 709/206; 709/207; 709/227; 709/228; 709/229

(58) Field of Classification Search
USPC .................. 370/352–356, 260; 709/204–207, 709/213–216, 220–229; 714/4; 713/189, 713/190, 2, 193; 726/2–4, 26–30
See application file for complete search history.

(56) References Cited

U.S. PATENT DOCUMENTS

| 6,219,694 | B1* | 4/2001 | Lazaridis et al. | 709/206 |
|---|---|---|---|---|
| 6,363,411 | B1* | 3/2002 | Dugan et al. | 709/202 |
| 6,463,446 | B1 | 10/2002 | Wollrath et al. | |
| 6,487,607 | B1 | 11/2002 | Wollrath et al. | |
| 6,598,094 | B1 | 7/2003 | Wollrath et al. | |
| 6,604,127 | B2 | 8/2003 | Murphy et al. | |
| 6,654,793 | B1 | 11/2003 | Wollrath et al. | |
| 2002/0078153 | A1* | 6/2002 | Chung et al. | 709/204 |
| 2002/0186687 | A1* | 12/2002 | Roque et al. | 370/352 |
| 2003/0167304 | A1* | 9/2003 | Zhu et al. | 709/205 |
| 2005/0021695 | A1* | 1/2005 | Takamine | 709/220 |
| 2005/0022007 | A1* | 1/2005 | Phillips et al. | 713/201 |
| 2006/0067249 | A1* | 3/2006 | Poustchi et al. | 370/260 |
| 2006/0146800 | A1* | 7/2006 | Yanai et al. | 370/352 |

OTHER PUBLICATIONS http://www.sun.com/software/jinni/whitpapers/jinni-execoverview.pdf "JiniTM Network Technology" An executive Overview, pp. 1-16, Feb. 2001.

* cited by examiner

*Primary Examiner* — Asad Nawaz
*Assistant Examiner* — Kai Chang
(74) *Attorney, Agent, or Firm* — Browdy and Neimark, PLLC

(57) ABSTRACT

A method and device are provided for conducting a real-time, voice over IP media type of communication session between at least two peer users, each associated with a platform comprised in a distributed communication network. The method and device comprise providing at least one replication of at least one data object to all other platforms associated with that distributed communication network.

14 Claims, 2 Drawing Sheets

METHOD AND DEVICE USING DATA OBJECTS AND THEIR REPLICATIONS FOR CARRYING OUT COMMUNICATIONS IN A DISTRIBUTED SYSTEM

FIELD OF THE INVENTION

This invention generally relates to distributed systems and, more particularly, to a method and apparatus for allowing communication between objects in a distributed system.

BACKGROUND OF THE INVENTION

Distributed systems typically comprise multiple machines, such as computers and other peripheral devices, connected in a network, such as, a Local Area Network ("LAN"), Wide Area Network ("WAN"), or the Internet. Typically, distributed systems require that computational entities (e.g., applications, programs, etc.) running in different address spaces, on different or the same platforms, be able to communicate with each other.

For a basic communication mechanism, distributed systems utilize communication between applications residing in different address spaces.

In today's Voice over IP ("VoIP") world, an entity that wishes to initiate a call is required to obtain an IP address that is associated with the other party. Furthermore, the process associated with establishing a voice over IP call involves sending and receiving proper control messages, in which call control and presence information are exchanged. Such process of exchanging information between the two parties to the call relies on the existence of information that would allow identifying the IP address of the other party, and is the basis for establishing of calls, disconnecting calls, notifying on changes in the presence status, etc., and failure in having the proper information would prevent the conducting of the required communication session.

Also, another problem arises when such a distributed system is used for VoIP calls. This problem concerns the identification of the parties to the call. Typically, all objects that share that space may become aware that a communication session which involves an object of that domain is being established. In such a case, an object may be disguised as that object, and "intercept" the call to an undesired destination, or even become a listener to that call, where the two genuine parties are unaware of its presence in the call.

SUMMARY OF THE INVENTION

In order to solve the above described problems, one of the objects of the present invention is provide a solution for establishing and carrying out a voice call, where the participants utilizes VoIP technology and are connected to a distributed network.

Another object of the present invention is to provide a solution to establish such a voice call in a relatively secured environment.

Further objects and features of the invention will become apparent from the following description and the accompanying drawings.

According to a first aspect of the present invention there is provided a method for conducting a real-time, voice over IP media type of communication session between at least two peer users, where each of these users is associated with a platform belonging to distributed communication network. The method is based on providing at least one replication of at least one data object to all other platforms associated with the distributed communication network.

According to a preferred embodiment of this aspect of the invention, the method further comprises a step of providing a notification at all platforms associated with the distributed communication network, indicating the creation or modification of the at least one data object.

By an embodiment of the invention, two or more of the peer users may be associated with a single platform. Preferably, no replication is created at the platform associated with at least two of the peer users taking part in this communication session. Additionally or in the alternative, at least two of the peer users are each associated with a platform located at a different location than the other.

In accordance with yet another embodiment of the invention there is provided a method for establishing a real-time, voice over IP media communication session, which comprises the steps of:

registering each of the at least two peer users at the distributed communication network;

at a platform associated with a first of the at least two peer users, creating a data object which comprises a request initiated by said first of the at least two peer users to establish a communication session with at least one other of the at least two peer users, and the identification of the at least two peer users;

providing a replication of the data object to all other platforms associated with the distributed communication network;

if the at least one other of the at least two peer users is associated with a platform other than the one with which the first of said at least two peer users is associated, receiving a notification at all platforms associated with the distributed communication network, indicating the creation or modification of said data object;

receiving a replication of said data object and processing it by a computational entity located thereat;

determining whether the real-time communication session may be established between the at least two peer users; and if in the affirmative, establishing the real-time communication session between the at least two peer users.

Preferably, the method further comprises confirming the accessibility of the object resident on one or more of said platforms associated with the at least one other of the at least two peer users, prior to the step of receiving a replication of said data object. In the alternative, the step of receiving a replication of the data object, further comprises confirming the accessibility of object(s) resident on one or more of the platforms associated with the at least one other of the at least two peer users.

In the case that the object(s) is determined to be non-accessible, the step of receiving a replication of the data object further comprises repeating the step of confirming the object accessibility every pre-determined period of time.

Additionally or in the alternative, in case the object(s) is determined to be non-accessible, the step of receiving a replication of the data object further comprises providing the object with a message indicating that a request to establish a communication session therewith is or was made.

Preferably, this comprises an indication of the identity of the entity initiating the request to establish the communication session.

By still another embodiment of the invention the data object is transmitted in an encrypted form and is adapted to be decrypted by at least one entity with which the communication session is to be established.

According to yet another embodiment of the invention, all messages exchanged prior to establishing the communication session, are exchanged in an encrypted form that can be decrypted by entities to which the messages are directed.

By yet another aspect of the invention there is provided a computer-readable medium containing instructions that perform a method, when executed by a processor, for conducting a real-time, voice over IP media type of communication session between at least two peer users, each associated with a platform comprised in a distributed communication network, wherein the method comprises sending at least one replication of at least one data object to all other platforms associated with said distributed communication network.

According to an embodiment of this aspect of the invention, the method further comprises a step of sending a notification to all platforms associated with the distributed communication network, indicating the creation or modification of the at least one data object.

In accordance with yet another embodiment of the invention, there is provided a computer-readable medium containing instructions that perform a method, when executed by a processor, for establishing a real-time, voice over IP media type of communication session in a distributed system, wherein the method enables computational entities to maintain references indicating the location of objects within the distributed system, by:

registering a first peer user at the distributed communication network;

at a platform associated with the first peer user, creating a data object which comprises a request to establish a communication session with at least one other peer user, and preferably the identification of the first peer user and the at least one other peer user;

sending a notification to at least one platform associated with the at least one other peer user, indicating the creation or modification of the data object;

sending a replication of the data object to the at least one platform associated with the at least one other peer user;

determining whether the real-time communication session may be established between the first and the at least one other peer users; and if in the affirmative, establishing the real-time communication session therebetween.

According to yet another aspect of the invention there is provided a distributed communication system which comprises:

a first client system including an object; and
a second client system including:
a client process; and
a remote process configured, when executed by a processor, to register a request to establish a real-time, voice over IP media type of communication session with an object of the first client system, by:
providing a replication of the request to the first client system;
exchanging messages between the first and second client systems, and
based on the information retrieved from the messages exchanged, determining whether a communication session may be established between the first and second client systems;
if in the affirmative, establishing a communication session between the first and second client systems.

By still another aspect of the present invention there is provided an object for use in a distributed communication system, comprising one or more commands adapted to activate a client server to carry out instructions for conducting a real-time voice over IP media type of communication session between at least two users associated with the distributed system.

BRIEF DESCRIPTION OF THE DRAWINGS

A better understanding of the present invention is obtained when the following non-limiting detailed description is considered in conjunction with the following drawings in which.

DETAILED DESCRIPTION OF THE INVENTION

Reference will now be made in detail to an implementation consistent with some embodiments of the present invention as illustrated in the accompanying drawings.

Systems operative in accordance with the present invention are adapted to operate as a distributed system. The term "remote" is used herein to distinguish between an object located in an address space designated for a machine operating in association with a computational entity and an object located in an address space that is different from the address space designated for a machine operating in association with the computational entity, the latter situation presenting a "remote" object. Consequently, an object located on the same physical machine as a computational entity can be considered a "remote" object with respect to that entity provided the computational entity uses an address space different from the space holding the object.

Figure 1:
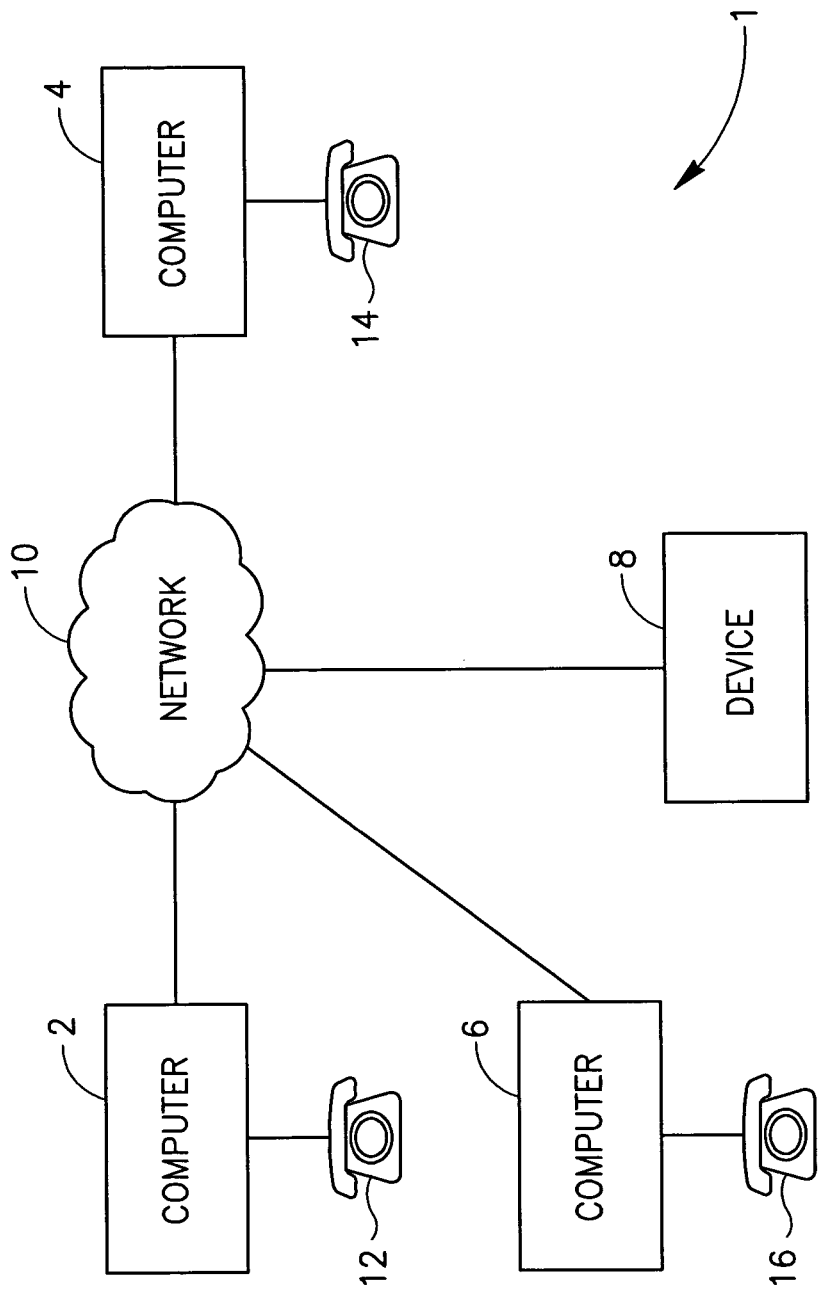
FIG. 1 illustrates an example of a network architecture in which systems according to an embodiment of the present invention may be implemented.

Methods and systems consistent with the present invention operate in distributed systems comprised of, for example, multiple machines. An exemplary distributed system is shown in FIG. 1. This distributed system is generally comprised of various components, including both hardware and software. The exemplary distributed system (a) allows users of the system to share services and resources over a network of many devices; (b) provides programmers with tools and programming patterns that allow development in a distributed systems; and (c) simplifies the task of administering the distributed system. To accomplish these goals, the distributed system utilizes a programming environment that allows both code and data to be moved from device to device in a seamless manner. Accordingly, the distributed system is layered on top of the programming environment, including the security offered by it.

In the exemplary distributed system, different computers and devices are associated with what appears to the user to be a single system. By appearing as a single system, the distributed system provides the simplicity of access and the power of sharing that can be provided by a single system without giving up the flexibility and personalized response of a personal computer or workstation. The distributed system may contain a large number of devices operated by users who are geographically disperse, but who share basic notions of trust, administration, and policy.

Distributed system 1 shown in FIG. 1 is comprised of computers 2, 4 and 6, their respective IP telephones 12, 14 and 16 connected thereto and device 8 interconnected by a network 10, and sharing an address space. Device 8 may be any of a number of devices, such as a printer, fax, storage device, or other devices. Network 10 may be a LAN, WAN, or the Internet. Although only three computers and one device are depicted as comprising distributed system 1, one skilled in the art will appreciate that such a distributed system typically includes additional computers and devices or even computers alone without any devices.

Upon connecting any of the devices to the address space, each such device is registered to receive notifications on all messages directed to its address. The typical mode of communication is by having a registered device, say computer 2, sending an object (e.g. a template) to the address space, where preferably that object comprises an indication identifying its sender (computer 2). When such an object is sent to the address space by another device associated with that space (e.g. by computer 4), a notification is received by device 2, indicating that a message was sent to device 4.

Let us now assume that a voice call is to be established between a user via telephone 14 connected to computer 4 and the user using telephone 12 connected to computer 2. The user will input a code identifying the other user with whom the call is to be established (e.g. dial the number of telephone 12, or input a code identifying telephone 12), by using his telephone set 14. This input initiates an event which in turn is replicated at all other machines associated with the distributed system, and a notification is sent to device 4. Device 4 will in turn send a message (an object) to the address space, e.g. "make call (12)". When this object is received at the address space, computer 2 will be notified of the receipt of this object. Upon receipt of the object by computer 2, a control command "ring" will be forwarded to telephone set 12. From telephone 12, a return message (e.g. "alert") is sent to the address space, received by device 4, and interpreted for the user's telephone associated with computer 4 as a ring back tone. Once user of telephone 12 accepts the call (e.g. by lifting the telephone handset) a connection is established and the call is made as a VoIP call as known per se in the art.

By an embodiment of the present invention, prior to sending an object to the address space with a message identifying telephone 12 as the target for the call to be established, a status update is initiated by computer 4 to receive notification as to the status associated with telephone 12 (e.g. its being on-line, its accessibility at a specific time, etc.). Telephone 12 is determined to be inaccessible when, for example, either when a network partition prevents from accessing this remote device. Such a partition can occur as a result of a communication problem with the computational entity's machine (device 2) that prevents it from accessing the machine associated with the remote object (device 1) or a communication problem associated with that remote object's machine. Thus, if user of telephone 12 is currently engaged with another call, the object will not be placed in the space and user of telephone 14 will receive a notification of that status (e.g. a busy tone).

In the alternative and according to another embodiment of the invention, the object sent via computer 14 with a request to establish a call with the user of telephone 12, is sent to the address space without prior knowledge of the status of telephone 12 (or of computer 2). Once the object reaches the address space, it initiates a status investigation regarding device 2 (or telephone 12), similarly to the one described above. If the outcome of that investigation is that computer 2 (or telephone 12) is not available to establish the call, the object sent by device 4 will initiate the formation of a queue-like buffer, preferably one that is designated for device 2 (if one has not already been established). Device 2 may probe that buffer either when the device becomes available to handle a new call, or at every pre-determined period of time. Preferably, in such a case, when according to the information retrieved from probing the buffer it turns out that there is a call waiting, user of telephone 12 may receive a waiting call indication, preferably with the identification of the other party, (user of telephone 14 in the present example).

However, as described above, one of the problems associated with such a distributed system is the fact that all the process of establishing the call is conducted in the address space in a manner as described above, where each of the devices that is connected to that space is exposed to the information exchanged. Let us now consider a case where the user of telephone 16 is interested in intercepting, or listening, to the call destined to the user of telephone 14. In such a case, since there is full replication in the address space, computer 6 can share that call as a listener, while the two genuine parties users of telephones 12 and 14, are unaware of its presence. In a more severe situation, computer 6 after communicating with the system and receiving a proxy to be connected thereto, will be registered in the space under an assumed name (e.g. as computer 4), and will receive the notifications and/or messages destined to computer 4, and act thereupon.

In order to prevent such unauthorized misuse of the system, the following exemplifies a method conducted in accordance with another embodiment of the present invention. In accordance with this example, at the first opportunity, preferably when a new device joins the network and is accepted as an entity that shall have an access to the address space, that device is provided with a code that is unique in the distributed system, and will be reserved thereafter for that device ("private code"), also another code is defined in the system for that specific device. This other code is provided to all other devices associated with this distributed system ("public code"). Preferably, when all other devices are notified about the joining of that new device to the system, they are also provided with the public code of this new device.

Now, let us consider once again a case where a call is to be established between the users using telephone 14 connected to computer 4 and telephone 12 connected to device 2, respectively, while ensuring that the user associated with computer 6 is unable to join that call. The user of telephone 14 inputs again a code identifying the other user with whom the call is to be established. This input initiates an event, so that an event notification is sent to computer 4. In response, computer 4 will now send a message (an object) to the address space, e.g. "make call (12)", but this time the message will be encrypted with the public code associated in the system with computer 2. When the encoded object is received at the address space, all devices will make an attempt to decrypt it, but only computer 2, having its private code will be able to decrypt that message and act thereupon. The rest of the process may be carried out in a way similar to that described above, with the difference that the messages leading to the establishment of the call are encrypted by both parties (2 and 4) by the method described so that no other entity may gain a knowledge of the call that is about to be established.

Figure 2:
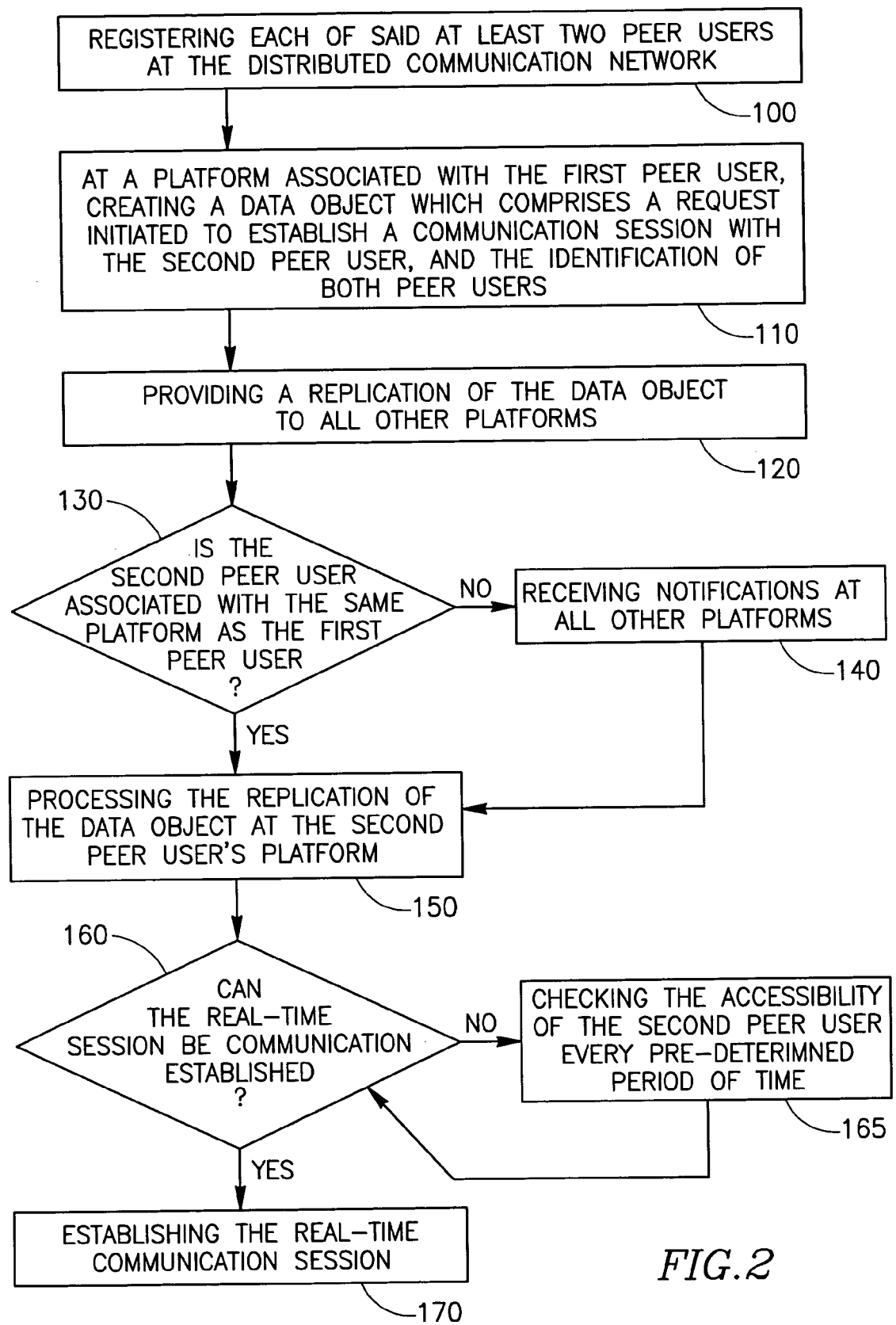
FIG. 2 is a flow chart diagram illustrating a data flow for establishing a communication session in a distributed system in accordance with an embodiment of the present invention.

Let us turn now to FIG. 2 which is a flow chart diagram illustrating a data flow for establishing a communication session in a distributed system between two peer users in accordance with an embodiment of the present invention. In step 100, each of the two peer users is registered at the distributed communication network. As will be appreciated by those skilled in the art, the registration may be either just before establishing the session, or any time before that. By step 110, a data object which comprises a request initiated by one of the peer users (the first peer user) to establish a communication session with a second, and the identification of the two peer users. Next, a replication of the data object is sent to all other platforms associated with the distributed communication network (step 120). If both peer users are not associated with the same platform (130), then a notification at all platforms associated with said distributed communication network is received, where the notification indicates the creation or modification (during the communication session) of the data object (step 140).

Next (step 150), a replication of the data object is received and processed by the appropriate computational entities.

Thereafter, if possible, a real-time communication session is established (step 170). Otherwise, the accessibility of the second peer user is checked every pre-defined period of time (step 165).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow:

The invention claimed is:

1. A method for conducting a real-time, voice over IP media type of communication session between at least two peer users, each associated with a platform comprised in a distributed communication network, wherein the method comprises:

in response to a request initiated by a first user from among the at least two users, creating at a platform comprised in said distributed communication network, a data object which stores data that includes an identification of another user from among the at least two users;

providing a plurality of replications of said data object to a plurality of other platforms associated with said distributed communication network so that that each of said plurality of replications reside at a different platform associated with the distributed communication network; and providing a notification at the plurality of other platforms associated with said distributed communication network, indicating the creation or modification of said data object; and wherein said real-time, voice over IP media communication session is established according to the steps of:

registering each of said at least two peer users at the distributed communication network;

at a platform associated with a first of said at least two peer users, creating a data object which comprises a request initiated by said first of said at least two peer users to establish a communication session with at least one other of said at least two peer users, and the identification of said at least two peer users;

creating a plurality of replications of said data object and distributing said plurality of replications among all other platforms associated with said distributed communication network;

if said at least one other of said at least two peer users is associated with a platform other than the one with which said first of said at least two peer users is associated, receiving a notification at all platforms associated with said distributed communication network, indicating the creation or modification of said data object;

receiving a replication of said data object and processing it by a computational entity located thereat;

determining whether said real-time communication session may be established between said at least two peer users; and if in the affirmative, establishing said real-time communication session between said at least two peer users.

2. The method according to claim 1, wherein at least two of said at least two peer users are associated with a single platform.

3. The method according to claim 2, wherein no replication is created at the platform associated with said at least two of said at least two peer users.

4. The method according to claim 1, wherein at least two of said at least two peer users are each associated with different platform.

5. The method according to claim 1, further comprising confirming the accessibility of the data object resident on one or more of said platforms associated with said at least one other of said at least two peer users, prior to the step of receiving a replication of said data object.

6. The method according to claim 1, wherein the step of receiving a replication of said data object, further comprises confirming the accessibility of the data object resident on one or more of said platforms associated with said at least one other of said at least two peer users.

7. The method according to claim 6, wherein in case said data object is determined to be non-accessible, the step of receiving a replication of said data object further comprises repeating the step of confirming said object accessibility every pre-determined period of time.

8. The method according to claim 6, wherein in case said data object is determined to be non-accessible, the step of receiving a replication of said data object further comprises providing said data object with a message indicating that a request to establish a communication session therewith is or was made.

9. The method according to claim 8, wherein said message indicating that a request to establish a call comprises an indication of the identity of the entity initiating said request to establish the communication session.

10. The method according claim 1, wherein said data object is transmitted in an encrypted form and is adapted to be decrypted by at least one entity with which said communication session is to be established.

11. The method according to claim 1, wherein all messages exchanged prior to establishing said communication session, are exchanged in an encrypted form that can be decrypted by entities to which said messages are directed.

12. A non-transitory computer-readable medium containing instructions that perform a method, when executed by a processor, for conducting a real-time, voice over IP media type of communication session between at least two peer users, each associated with a platform comprised in a distributed communication network, wherein the method comprises: in response to a request initiated by a first user from among the at least two peer users, creating at a platform comprised in said distributed communication network, a data object which stores data that includes an identification of another user from among the at least two peer users; sending a plurality of replications of said data object to a plurality of the other platforms associated with said distributed communication network, so that that each of said plurality of replications reside at a different platform associated with the distributed communication network; and providing a notification at all the plurality of other platforms associated with said distributed communication network, indicating the creation or modification of said data object, and wherein said real-time, voice over IP media communication session is established according to the steps of:

registering each of said at least two peer users at the distributed communication network;

at a platform associated with a first of said at least two peer users, creating a data object which comprises a request initiated by said first of said at least two peer users to establish a communication session with at least one other of said at least two peer users, and the identification of said at least two peer users;

creating a plurality of replications of said data object and distributing said plurality of replications among all other platforms associated with said distributed communication network;

if said at least one other of said at least two peer users is associated with a platform other than the one with which said first of said at least two peer users is associated, receiving a notification at all platforms associated with said distributed communication network, indicating the creation or modification of said data object;

receiving a replication of said data object and processing it by a computational entity located thereat;

determining whether said real-time communication session may be established between said at least two peer users; and if in the affirmative, establishing said real-time communication session between said at least two peer users.

13. A non-transitory computer-readable medium containing instructions that perform a method, when executed by a processor, for establishing a real-time, voice over IP media type of communication session in a distributed system, wherein the method enables computational entities to maintain references indicating the location of objects within the distributed system, by:

registering a first peer user at the distributed communication network;

at a platform associated with said first peer user, creating a data object which comprises a request to establish a communication session with at least one other peer user, and the identification of said first peer user and said at least one other peer user;

sending a notification to a plurality of platforms associated with said distributed communication network, indicating the creation or modification of said data object;

replicating said data object and sending each of the plurality of replications of said data object to said plurality of platforms;

determining whether said real-time communication session may be established between said first and said at least one other peer users; and if in the affirmative, establishing said real-time communication session therebetween, and wherein said real-time, voice over IP media communication session is established according to the steps of:

registering each of said at least two peer users at the distributed communication network;

at a platform associated with a first of said at least two peer users, creating a data object which comprises a request initiated by said first of said at least two peer users to establish a communication session with at least one other of said at least two peer users, and the identification of said at least two peer users;

creating a plurality of replications of said data object and distributing said plurality of replications among all other platforms associated with said distributed communication network;

if said at least one other of said at least two peer users is associated with a platform other than the one with which said first of said at least two peer users is associated, receiving a notification at all platforms associated with said distributed communication network, indicating the creation or modification of said data object;

receiving a replication of said data object and processing it by a computational entity located thereat;

determining whether said real-time communication session may be established between said at least two peer users; and if in the affirmative, establishing said real-time communication session between said at least two peer users.

14. A distributed communication system comprising:

a first communication system including plurality of data objects, each storing data that includes an identification of a single user; and a second communication system including:

a client process; and a remote process configured, when executed by a processor, to register a request to establish a real-time, voice over IP media type of communication session with an object of the first communication system, by:

at a platform comprised in said distributed communication network, creating in response to a request initiated by a first user, said data object associated with another user;

providing a plurality of replications of the request to a plurality of platforms associated with said first communication system so that each of said plurality of replications reside at a different platform thereat;

providing a notification at said platforms associated with said first communication system, indicating the creation or modification of said data object;

exchanging messages between the first and second communication systems, and based on the information retrieved from the messages exchanged, determining whether a communication session may be established between the first and second communication systems;

if in the affirmative, establishing a communication session between the first and second communication systems, and wherein said real-time, voice over IP media communication session is established according to the steps of:

registering each of said at least two peer users at the distributed communication network;

at a platform associated with a first of said at least two peer users, creating a data object which comprises a request initiated by said first of said at least two peer users to establish a communication session with at least one other of said at least two peer users, and the identification of said at least two peer users;

creating a plurality of replications of said data object and distributing said plurality of replications among all other platforms associated with said distributed communication network;

if said at least one other of said at least two peer users is associated with a platform other than the one with which said first of said at least two peer users is associated, receiving a notification at all platforms associated with said distributed communication network, indicating the creation or modification of said data object;

receiving a replication of said data object and processing it by a computational entity located thereat;

determining whether said real-time communication session may be established between said at least two peer users; and if in the affirmative, establishing said real-time communication session between said at least two peer users.

\* \* \* \* \*